(12) United States Patent
Suzuki et al.

(10) Patent No.: US 8,699,847 B2
(45) Date of Patent: Apr. 15, 2014

(54) FILE MANAGEMENT APPARATUS, RECORDING APPARATUS, AND RECORDING PROGRAM

(75) Inventors: Katsuhiko Suzuki, Nagano (JP); Norihito Suganuma, Nagano (JP); Yuki Murata, Nagano (JP)

(73) Assignee: Sony Corporation, Tokyo (JP)

( * ) Notice: Subject to any disclaimer, the term of this patent is extended or adjusted under 35 U.S.C. 154(b) by 116 days.

(21) Appl. No.: 13/043,894

(22) Filed: Mar. 9, 2011

(65) Prior Publication Data

US 2011/0262110 A1   Oct. 27, 2011

(30) Foreign Application Priority Data

Apr. 22, 2010   (JP) ................................. 2010-098823

(51) Int. Cl.
*H04N 5/932* (2006.01)

(52) U.S. Cl.
USPC .......................................... 386/219; 386/200

(58) Field of Classification Search
None
See application file for complete search history.

(56) References Cited

U.S. PATENT DOCUMENTS

| | | | |
|---|---|---|---|
| 2004/0013399 A1 | 1/2004 | Horiguchi et al. | |
| 2006/0248111 A1* | 11/2006 | Park | 707/102 |
| 2010/0245275 A1* | 9/2010 | Tanaka | 345/173 |
| 2010/0318357 A1* | 12/2010 | Istvan et al. | 704/251 |
| 2010/0325709 A1* | 12/2010 | Kawase | 726/7 |
| 2011/0261217 A1* | 10/2011 | Muukki et al. | 348/222.1 |

FOREIGN PATENT DOCUMENTS

JP   2003-116104   4/2003

* cited by examiner

*Primary Examiner* — William C Vaughn, Jr.
*Assistant Examiner* — Eileen Adams
(74) *Attorney, Agent, or Firm* — Oblon, Spivak, McClelland, Maier & Neustadt, L.L.P.

(57) ABSTRACT

A file management apparatus includes: a display unit; an operation unit; a storage which stores first files movable to a portable apparatus and second files unmovable to the portable apparatus; an interface to which the portable apparatus is connected and through which the first files are moved between the storage and the portable apparatus; and a control unit which displays a list of the first files on the display unit when the operation unit operates a first operation and displays a list of the second files on the display unit when the operation unit operates a second operation and which generates a graphical user interface to display an operation button, which is used to move the first files to the portable apparatus, on the display unit, when the portable apparatus is connected to the interface.

20 Claims, 10 Drawing Sheets

| PROGRAM NAME | RECORDING DATA | CHANNEL | RECORDING MODE | MOVABLE FLAG | FILE NAME |
|---|---|---|---|---|---|
| THE WORLD HERITAGE "SHIRETOKO" | 040120101800 | DT06 | FULLHD | NO | 040120101800axb.m4p |
| THE WORLD HERITAGE "SHIRETOKO" | 040120101800 | DT06 | QVGA | YES | 040120101800axc.q4p |
| BASEBALL BROADCASTING "GIANT – HIROSHIMA" | 040720101800 | DT05 | HALFHD | NO | 040720101800bdo.m4p |
| BASEBALL BROADCASTING "GIANT – HIROSHIMA" | 040720101800 | DT05 | QVGA | YES | 040720101800bdp.q4p |

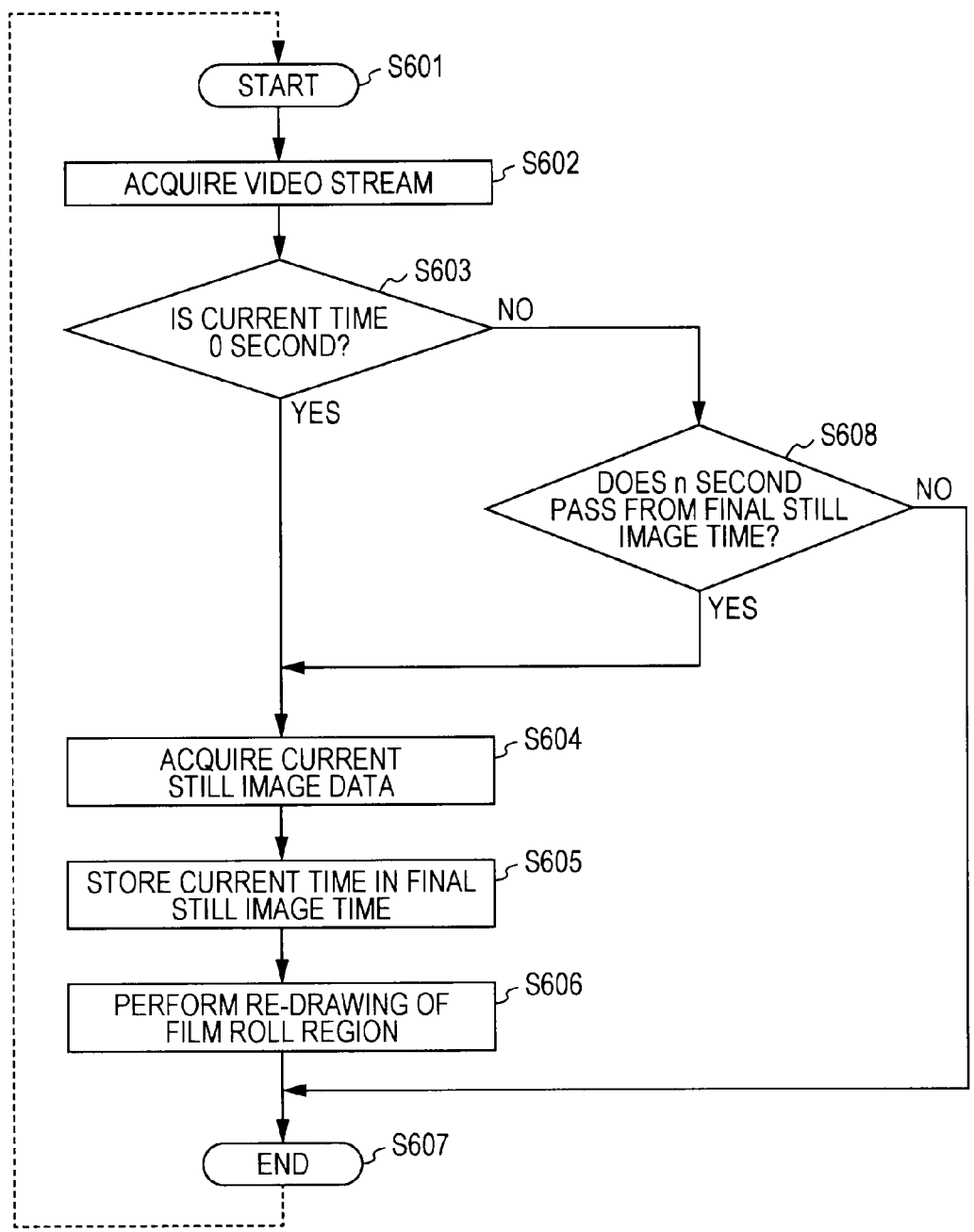

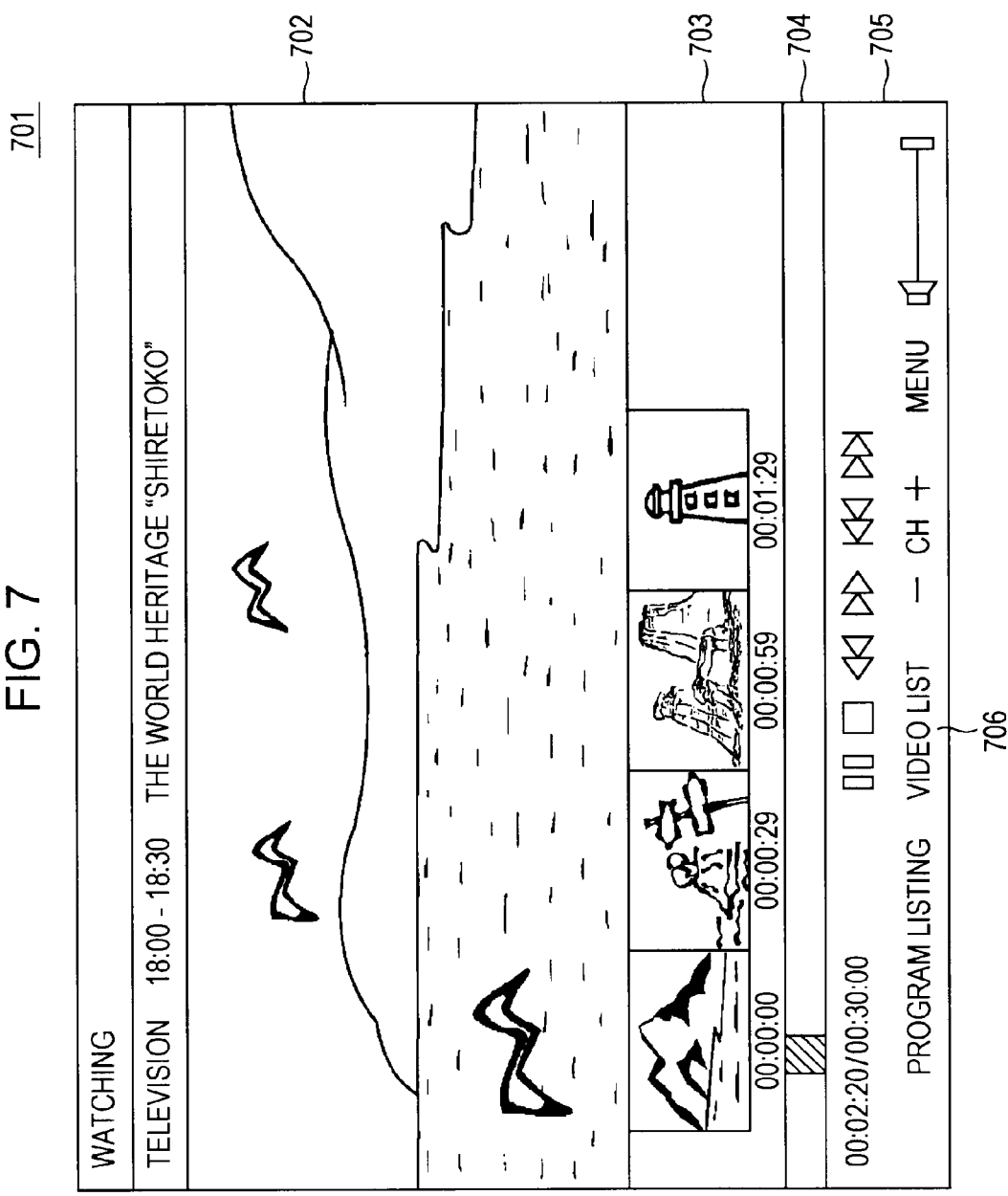

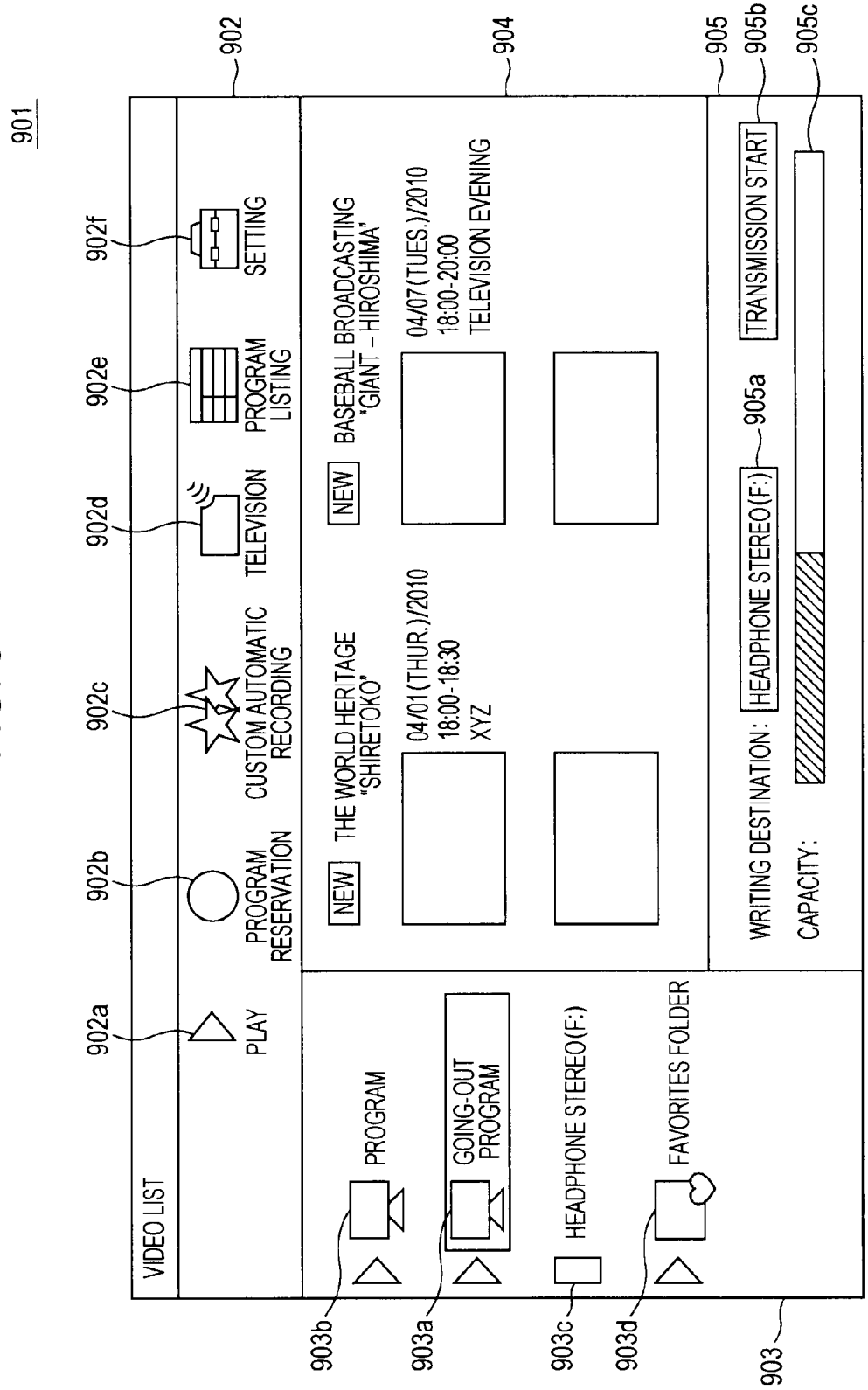

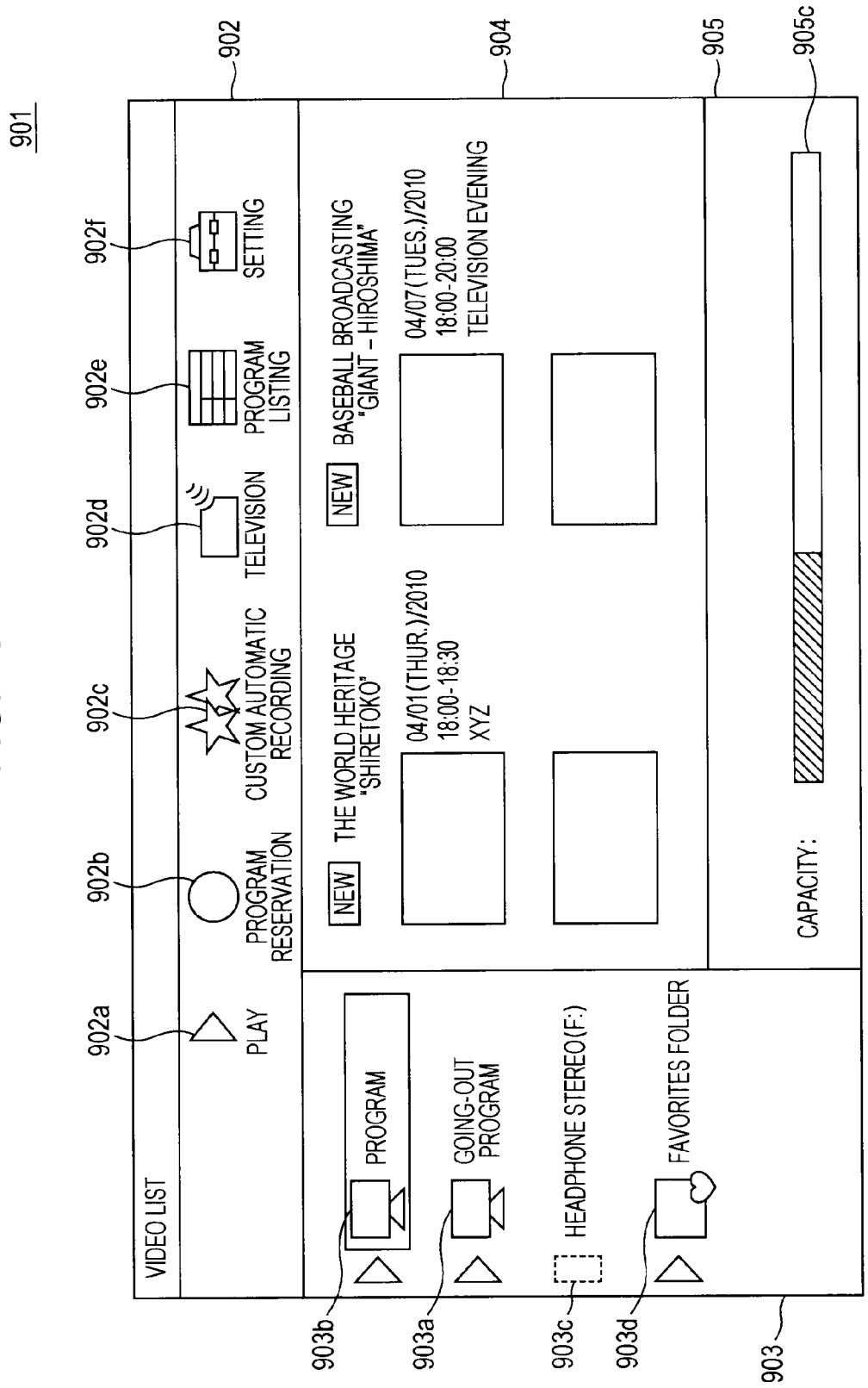

FILE MANAGEMENT APPARATUS, RECORDING APPARATUS, AND RECORDING PROGRAM

BACKGROUND OF THE INVENTION

1. Field of the Invention

The present invention relates to a file management apparatus, a recording apparatus, and a recording program, and more particularly, to a recording apparatus capable of simultaneously recording a television broadcast in two kinds of video files: a reduced video data file movable to a portable apparatus and a standard video data file unmovable to the portable apparatus.

2. Description of the Related Art

In recent years, a television broadcast has been digitized, and a recording apparatus has been changed from a video tape recorder to a hard disk recorder or a personal computer (hereinafter, abbreviated to a "PC"). Since a digital television broadcast has a very large amount of information of video data, a hard disk recorder or a PC recording apparatus reduces the amount of data without damage to image quality by using a video compression technique.

In particular, in the PC recording apparatus, it is easy to improve usability by advancing a software function since a software version can easily be updated.

A related art describing a technique similar to the technique according to an embodiment of the invention is disclosed in Japanese Unexamined Patent Application Publication No. 2003-116104.

SUMMARY OF THE INVENTION

A recording apparatus using a PC manufactured and sold by the applicant uses a hardware transcoder simultaneously producing both a video file (standard video data file) with a general resolution and a reduced video data file which can be reproduced by a portable apparatus, when a recording apparatus records a television broadcast, in order to improve a processing capability and convenience. Until now, a reduced video file had to be generated from a standard video file by once again performing reduction transcoding or reduction re-encoding. Therefore, for users who wanted to view a recorded content with a portable game console or a portable video player, re-converting the video file was very troublesome and it took time to re-convert the video file. By using a hardware transcoder, a reduced video data file usable in a portable apparatus is generated as soon as the recording is complete. Therefore, it is very convenient for users.

The fact that two kinds of video files are simultaneously produced when recording the same television broadcast means that two program files with the same content are produced. Therefore, if a program file movable to a portable apparatus is not clearly specified by a given method, it is apparent that confusion is caused to the user.

In the light of the foregoing, it is desirable to provide a novel file management apparatus, a novel recording apparatus, and a novel recording program capable of selecting and operating a video file correctly movable to a portable apparatus without confusing a user.

According to an embodiment of the invention, there is provided a file management apparatus including: a display unit; an operation unit; a storage which stores first files movable to a portable apparatus and second files unmovable to the portable apparatus; an interface to which the portable apparatus is connected and through which the first files are moved between the storage and the portable apparatus; and a control unit which displays a list of the first files on the display unit when the operation unit operates a first operation and displays a list of the second files on the display unit when the operation unit operates a second operation and which generates a graphical user interface to display an operation button, which is used to move the first files to the portable apparatus, on the display unit, when the portable apparatus is connected to the interface.

When two kinds of files distinguished from each other are displayed on the display unit and the file movable to the portable apparatus is selected, a graphical user interface used to move the file to the portable apparatus is generated.

According to the embodiment of the invention, it is possible to provide a novel file management apparatus, a novel recording apparatus, and a novel recording program capable of selecting and operating a video file correctly movable to a portable apparatus without confusing a user.

BRIEF DESCRIPTION OF THE DRAWINGS

FIG. 5 is a schematic diagram illustrating a content table.

FIG. 6 is a flowchart illustrating a screen forming process executed by a GUI generation unit in a recording monitor.

FIG. 7 is a schematic diagram illustrating a recording monitor screen displayed on a display unit.

FIG. 9 is a schematic diagram illustrating a video list screen displayed on the display unit.

FIG. 10 is a schematic diagram illustrating the video list screen displayed on the display unit.

DESCRIPTION OF THE PREFERRED EMBODIMENTS

Figure 1:
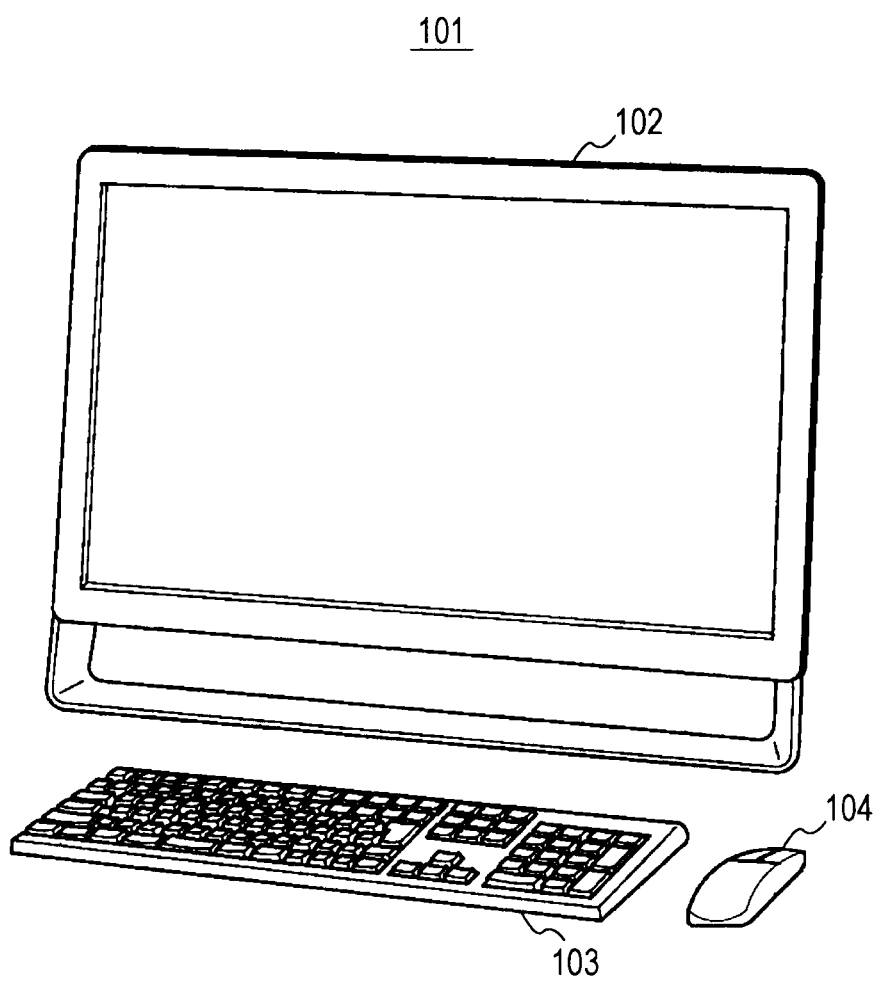
FIG. 1 is a diagram illustrating the outer appearance of a recording apparatus according to an embodiment.

FIG. 1 is a diagram illustrating the outer appearance of a recording apparatus according to an embodiment.

A recording apparatus 101 includes a main body 102 having a liquid crystal display, a keyboard 103, and a mouse 104. A general PC with an integrated liquid crystal display serves as the recoding apparatus 101. Of course, the recording apparatus 101 may not be integrated with a liquid crystal display.

Figure 2:
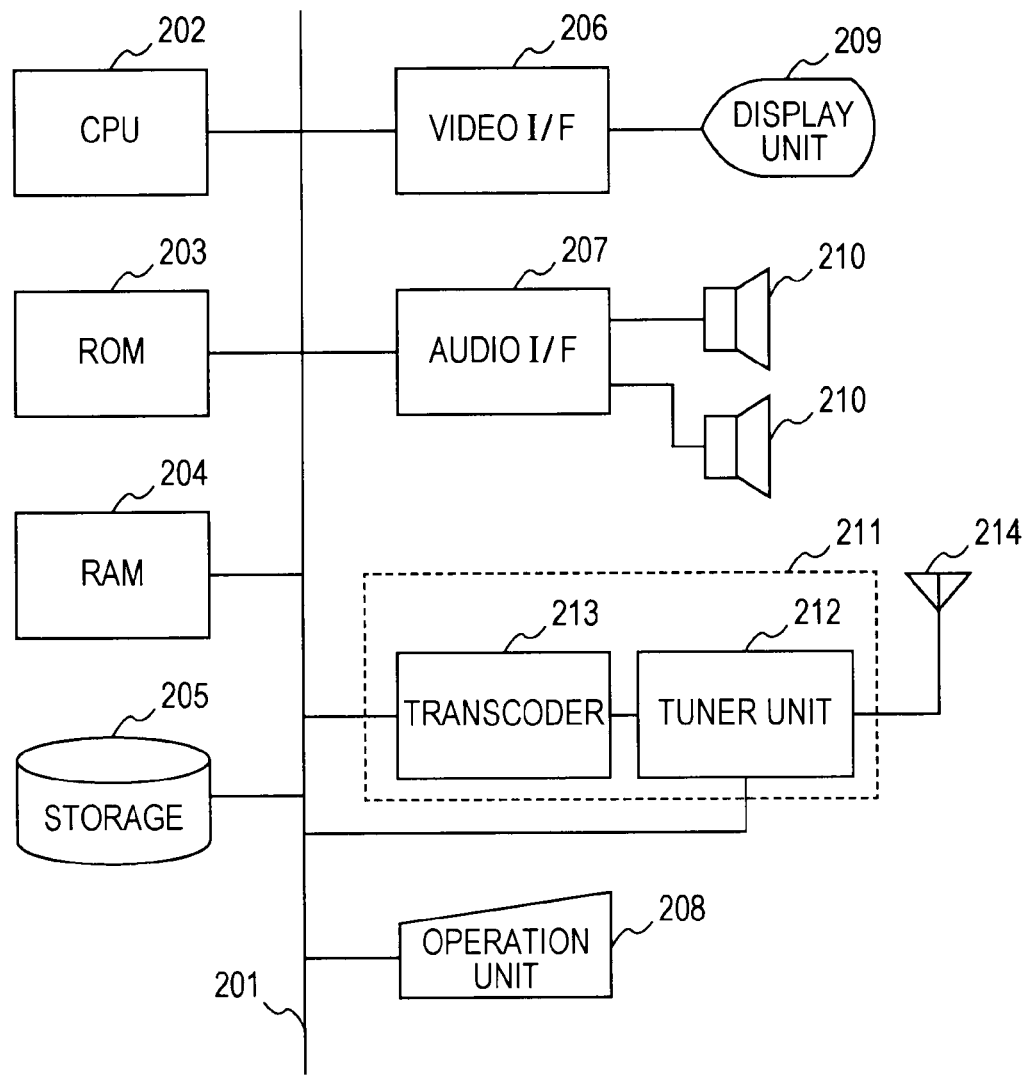
FIG. 2 is a block diagram illustrating the hardware configuration of a recording apparatus.

FIG. 2 is a block diagram illustrating the hardware configuration of the recording apparatus 101.

In the recording apparatus 101 which is a general PC, a CPU 202, a ROM 203, a RAM 204, a non-volatile storage 205 such as a hard disk device, a video interface 206 also called a graphics card, an audio interface 207, and an operation unit 208 which is a pointing device such as a keyboard and a mouse are connected to a bus 201.

A display unit 209 which is a liquid crystal display is connected to the video interface 206.

Speakers 210 are connected to the audio interface 207.

A television tuner card 211 is also connected to the bus 201. The television tuner card 211 is provided with a tuner unit 212 and a transcoder 213.

The tuner unit 212 has a tuned circuit receiving digital TV broadcast waves and a demodulation circuit demodulating digital video signals and digital sound signals from the digital TV broadcast waves therein.

The tuner unit 212 receives the digital TV broadcast waves via an antenna 214 and outputs digital video stream data conforming to the MPEG-2 standard of 1920 dots×1080 lines which is called a "full HD size."

The transcoder 213 converts MPEG-2 stream data with the full HD size into digital video stream data conforming to the MPEG-4 standard in real time without performing a decoding process to output two kinds of MPEG-4 standard video stream data with different resolutions. At this time, the two kinds of MPEG-4 standard video stream data are subjected to encryption processing.

Figure 3:
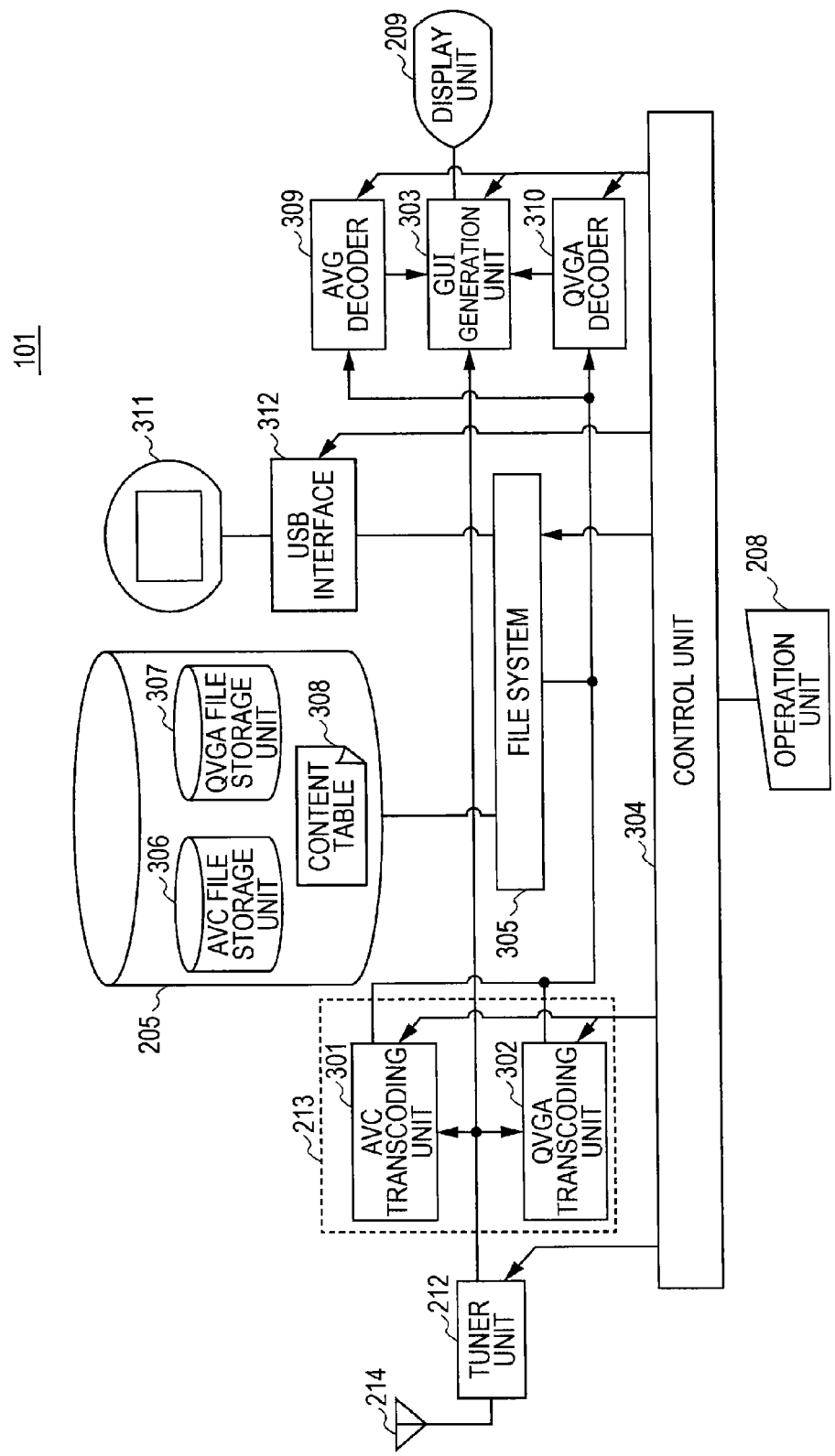
FIG. 3 is a block diagram illustrating the functions of the recording apparatus.

FIG. 3 is a functional block diagram illustrating the recording apparatus 101. For facilitating description, description of a sound of the video data will be omitted.

The PC serving as the recording apparatus 101 has a function of the recording apparatus 101 shown in FIG. 3 by installing an application program allowing a general OS and the PC to function as the recording apparatus 101 so that the OS and the application program operate.

The tuner unit 212 receives the digital TV broadcast waves via the antenna 214 and performs a demodulation process to output the MPEG-2 stream data with the full HD size.

The MPEG-2 stream data is supplied to an AVC transcoding unit 301, a QVGA transcoding unit 302, and a GUI generation unit 303.

The AVC transcoding unit 301 which is a standard transcoding unit performs transcoding and encryption processing on the input MPEG-2 stream data with the full HD size to generate the MPEG-4 stream data with the full HD size, when the AVC transcoding unit 301 receives a recording instruction from a control unit 304.

The QVGA transcoding unit 302 which is a reduction transcoding unit performs transcoding and encryption processing on the input MPEG-2 stream data with the full HD size to generate MPEG-4 steam data with a "Quarter VGA" size, that is, a reduced size of 320 dots×240 lines which is a quarter of VGA (640 dots×480 lines), when the QVGA transcoding unit 302 receives a recording instruction from the control unit 304. Moreover, when performing a transcoding process, the QVGA transcoding unit 302 generates still image data with the QVGA size of a general JPEG format for each GOP (Group of Pictures: 0.5 second and 15 frames) of the MPEG-4 stream data, allows the still image data to be included in the MPEG-4 stream data, and outputs the MPEG-4 stream data.

The MPEG-4 stream data with the full HD size, which is a recording video data stream output by the AVC transcoding unit 301, and the MPEG-4 stream data with the QVGA size, which is a reduced video data stream output by the QVGA transcoding unit 302, are transmitted to a storage 205 via a file system 305 installed in the OS to form a video file.

The MPEG-4 stream data with the full HD size is transmitted to an AVC file storage unit 306 installed in the storage 205 to form an AVC video file which is a standard video data file.

The MPEG-4 stream data with the QVGA size is transmitted to a QVGA file storage unit 307 installed in the storage 205 to form a QVGA video file which is a reduced video data file.

The control unit 304 issues a recording instruction to the AVC transcoding unit 301, the QVGA transcoding unit 302, and the file system 305 according to recording reservation information (not shown) stored in the operation unit 208 and the storage 205.

The control unit 304 gives a recording instruction to the AVC transcoding unit 301 and the QVGA transcoding unit 302 to start the transcoding process.

According to the recording instruction, the control unit 304 newly generates an AVC video file in the AVC file storage unit 306 for the file system 305, newly generates a QVGA video file in the QVGA file storage unit 307, and additionally stores a recording formed by matching a file name of the AVC video file and a file name of the QVGA video file to program information obtained from the recording reservation information for the content table 308.

The AVC video file stored in the file system 305 is subjected to an encryption decoding process and a decoding process by an AVC decoder 309 which is a standard video decoder. A video data stream output by the AVC decoder 309 is transmitted to a GUI generation unit 303.

Likewise, the QVGA video file stored in the file system 305 is subjected to an encryption decoding process and a decoding process by the QVGA decoder 310. A video data stream output by the QVGA decoder 310 is transmitted to the GUI generation unit 303.

The QVGA decoder 310 also decodes the MPEG-4 stream data with the QVGA size transmitted from the QVGA transcoding unit 302 during the recording. Moreover, the QVGA decoder 310 also transmits the still image data buried in the QVGA video file to the GUI generation unit 303, when performing the decoding.

The GUI generation unit 303 forms screen data to display a GUI (Graphical User Interface) and a video on the display unit 209.

The GUI generation unit 303 delivers the MPEG-2 stream data output by the tuner unit 212 to the display unit 209 without change under to the control of the control unit 304, when a user views a television without recording. In a case of the recording, the MPEG-2 stream data output by the tuner unit 212 is delivered as a monitor screen without change to the display unit 209 and the still image data output by the QVGA decoder 310 is also intermittently acquired and included in the screen data. In a case of reproduction, the AVC video file and the QVGA video file operated and selected through the operation unit 208 by the user are reproduced by the AVC decoder 309 and the QVGA decoder 310, respectively.

The QVGA video file can also be reproduced in a portable apparatus 311, such as a portable game console or a portable video reproduction apparatus, with limited hardware resources, since the screen size of the video data is small. Here, the file system 305 recognizes the portable apparatus 311 connected via a USB interface 312 as a detachable "USB storage" and an application program is configured so that the QVGA video file is moved from the storage 205 to the portable apparatus 311 when the user operates the operation unit 208.

Figure 4:
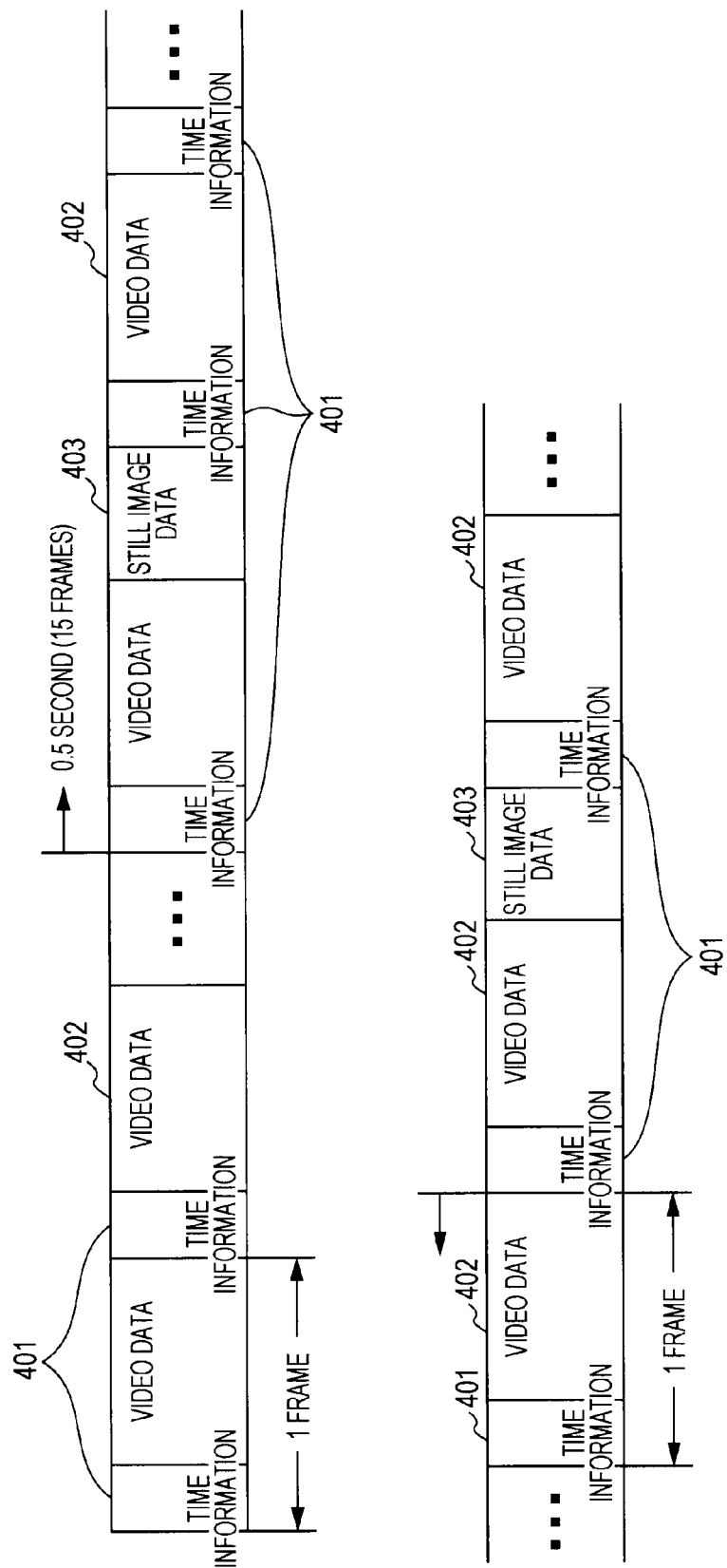
FIG. 4 is a schematic diagram illustrating the format of an MPEG-4 data stream with a QVGA size.

FIG. 4 is a schematic diagram illustrating the format of the MPEG-4 data stream with the QVGA size. Moreover, the format illustrated in this schematic diagram is also the format of the QVGA video file.

The MPEG-4 data stream with the QVGA size includes a pair of time information 401 and video data 402 frame by frame. The time information 401 is information indicating time passing from the position of a header of the video data stream. The video data 402 is data corresponding to one frame image.

The still image data 403 is still image data with the JPEG format and the QVGA size, as described above, and is stored in a user area of the MPEG-4 format. The still image data 403 is formed for every fifteen frames, that is, for each GOP.

FIG. 5 is a schematic diagram illustrating the content table 308.

A "program name" field stores a program name (title) of a recorded program.

A "recording data" field stores time information regarding the recorded program.

A "channel" field stores channel information regarding the recorded program.

A "recording mode" field stores information regarding a recording quality of a video file of a recorded program and the size of a screen.

A "movable flag" field stores flag information indicating whether the video file of the recorded program is permitted to be moved from the storage 205 to another portable apparatus 311.

A "file name" field stores the file name of a video file of the recorded program.

Film Roll Function

The recording apparatus 101 according to this embodiment has a function of displaying a still image in real time at a predetermined time interval below a video of a television broadcast displayed by the display unit 209 in the recording monitor.

Originally, this function is a function of generating still images at a predetermined time interval from a recorded video file and reproducing a scene of a recorded program desired to be viewed from an arbitrary reproduction position of the video file. The applicant calls this function a "film roll function" in that a still image serving as an index of a scene is displayed like a film.

The recording apparatus 101 according to the related art generates still images from a recorded video file after the recording is completed. It is difficult to generate still images for estimating a scene during the recording since the processing capability (hardware specification) of the PC of the recording apparatus 101 is limited. In the recording apparatus 101 according to this embodiment, however, the transcoder 213 generates the MPEG-4 stream data with the QVGA size including the still image data with the JPEG format in real time.

When the still image data is decoded from the MPEG-4 stream data with the QVGA size during the recording, a "film roll" can be formed in real time during the recording monitoring.

FIG. 6 is a flowchart illustrating a screen forming process performed by the GUI generation unit 303 in the recording monitor.

When the process starts (S601), the GUI generation unit 303 initially acquires the time information 401 from the MPEG-4 stream data with the QVGA size (S602).

When the acquired time is "0 second", that is, the initial time of the recording (YES in S603), the GUI generation unit 303 acquires the still image data 403 of the current frame (S604).

Next, the GUI generation unit 303 transcribes the current recording time in a variable "final still image time" provided in the RAM 204 (S605). Re-drawing of a film roll region 703 which is a collective of the still images serving as an index of a scene is performed (S606), and then the process ends (S607).

Even when the acquired time is not "0 second" in step S603, but when a predetermined time (n seconds) passes from the "final still image time" updated at step S605 (YES in S608), the processes of step S605 and S606 end as in the case of step S604 and YES of step S603 (S607).

When the acquired time of step S602 does not pass from the "final still image time" updated at the time of step S605 by the predetermined time (n seconds) (NO in S608), the process ends without performing any process (S607).

Although the process ends in step S607, the flow is returned to step S601 and is repeated.

FIG. 7 is a schematic diagram illustrating a recording motor screen displayed on the display unit 209.

A video of a program being currently broadcasted is displayed on a monitor region 702 in the middle of the screen. The film roll region 703 is displayed immediately below the monitor region 702. In the film roll region 703, the still image data 403 acquired from the MPEG-4 stream data with the QVGA size are further reduced and is arranged together with the time information 401. In FIG. 7, the sill images are displayed at a 30-second interval in the film roll region 703.

A time line 704 indicating a current broadcast time is displayed immediately below the film roll region 703. When recording is reserved, the current time indicates how many hours pass from the recording start time since the recording time is known in advance.

An operation panel 705 is displayed immediately below the time line 704. Various kinds of operations are performed for the recording apparatus 101 by clicking buttons displayed in the operation panel 705 with a pointing device such as a mouse.

A recording monitor screen 701 in FIG. 7 is also used as a typical television viewing screen. In this case, the film roll region 703 is not displayed.

Figure 8A:
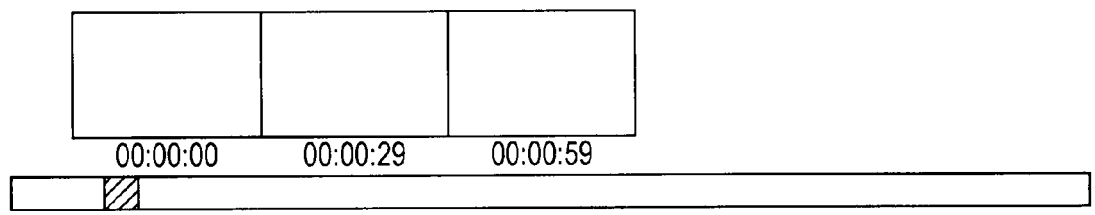
FIGS. 8A to 8C are schematic diagrams illustrating a film roll region varied during recording.
Figure 8B:
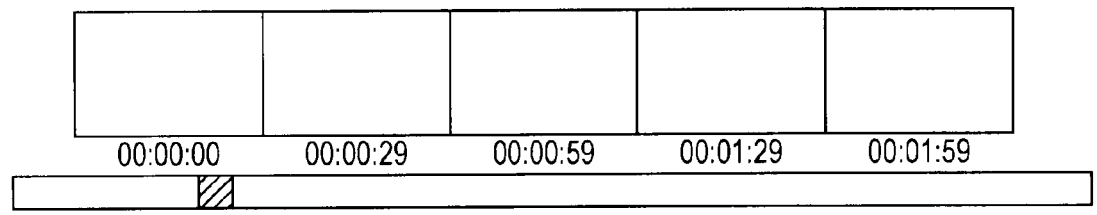
Figure 8C:
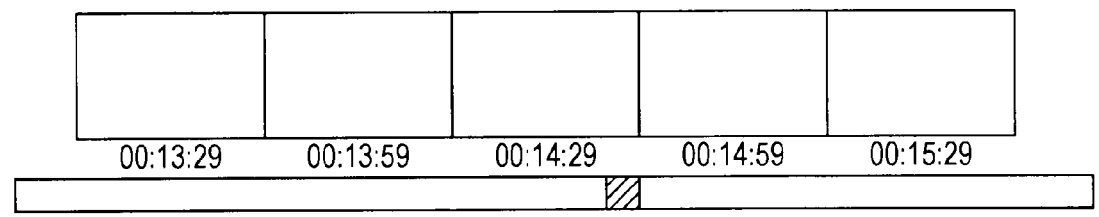

FIGS. 8A to 8C are schematic diagrams illustrating the film roll region 703 varied during the recording. In FIGS. 8A to 8C, the still images are displayed at the 30-second interval; as in FIG. 7.

In FIG. 8A, a display state of the film roll region 703 is shown during a recording period from 1 minute to 1 minute 28 seconds. In the film roll region 703, the still images are displayed at the times of "00:00:00", "00:00:29", and "00:00:59".

In FIG. 8B, a display state of the film roll region 703 is shown during a recording period from 2 minutes to 2 minutes 28 seconds. In the film roll region 703, the still images are displayed at the times of "00:01:29" and "00:01:59" in addition to "00:00:00", "00:00:29", and "00:00:59".

At these times, the film roll region 703 is buried in the still image which can be displayed. The still images after these times are displayed on the right end of the film roll region 703 and the still images displayed until then on the left end of the film roll region 703 simultaneously disappear from the film roll region 703.

In FIG. 8C, a display state of the film roll region 703 is shown during a recording period from 15 minutes 29 seconds to 15 minutes 58 seconds. During the recording, new still images are displayed from the right end of the film roll region 703 and the old still images simultaneously disappear from the left end of the film roll region 703. As a consequence, in the film roll region 703, the still images are displayed at the times of "00:13:29", "00:13:59", "00:14:29", "00:14:59", and "00:15:29".

The still images in the film roll region 703 displayed in this way serve as an index for "tracking reproduction" in which still images are reproduced from arbitrary reproduction positions in a video file being recorded.

The control unit 304 develops the still images and the time information 401 corresponding to the still images into the RAM 204, when forming the film roll region 703. When the still image is clicked, the control unit 304 reads the time information 401 corresponding to the clicked still image from the RAM 204, controls the AVC decoder 309, reads the AVC video file from the reproduction position of the designated time information, and performs the reproduction process.

Video File Moving Function

In the recording apparatus 101 according to this embodiment, since the transcoding unit 213 of the television tuner card 211 simultaneously performs two kinds of transcoding processes, the transcoding unit 213 can simultaneously generate the AVC video file with the full HD size and the QVGA video file with the QVGA size with one recording. Of the video files, the QVGA video file can also be reproduced in the portable apparatus 311, such as a portable game console or a portable video reproduction apparatus, with limited hardware resources.

Here, the file system 305 recognizes the portable apparatus 311 connected as the detachable "USB storage" via the USB interface 312 and the application program is configured so that the QVGA video file is moved from the storage 205 to the portable apparatus 311 when the user operates the operation unit 208.

At this time, it is necessary to clearly show the fact that "the QVGA video file is movable to the portable apparatus 311" and the fact that "a video file other than the QVGA video file is unmovable to the portable apparatus 311" on the GUI screen for the user.

FIG. 9 is a schematic diagram illustrating a video list screen displayed on the display unit 209. When a "video list" button 706 displayed on the operation panel 705 is pressed (clicked with the pointing device such as a mouse) in a state where the recording monitor screen 701 shown in FIG. 7 or a typical television viewing screen is displayed, a video list screen 901 shown in FIG. 9 is displayed on the display unit 209.

An operation button region 902 is displayed above the video list screen 901. As shown in FIG. 9, a "reproduction" button 902a used to reproduce a video file selected with a mouse or the like, a "program reservation" button 902b used to perform recording reservation, a "custom automatic recording" button 902c used to automatically generate recording reservation information of a program estimated to match preference of a user based on recording history information of the recording apparatus 101 for the user and to show the recording reservation information to the user, a "television" button 902d used to view a television, a "program listing" button 902e used to browse a program listing, and a "setting" button 902f used to perform various kinds of settings of an application program are displayed in the operation button region 902.

A medium list region 903 is displayed on the lower left side of the operation button region 902. A file list region 904 is displayed on the right side of the operation button region 902. When an icon displayed in the medium list region 903 is clicked and selected, the icon and a title character is highlighted and displayed and the icons of the video files associated with the above icon are listed in the file list region 904. In FIG. 9, a "going-out program" icon 903a is highlighted and displayed.

A "program" icon 903b on the uppermost side is an icon that is used to display a list of the AVC video files on the file list region 904.

The "going-out program" icon 903a is an icon that is used to display a list of the QVGA video files on the file list region 904.

A "portable apparatus" icon 903c is an icon that is used to display the name of the portable apparatus 311 and the logic drive name on Windows (registered trademark) when the portable apparatus 311 is connected to the USB interface 312 of the recording apparatus 101 and an icon used to display a list of the QVGA video files stored in the portable apparatus 311 on the file list region 904 when the "portable apparatus" icon 903c is clicked and selected. Moreover, the "portable apparatus" icon 903c is not displayed in the medium list region 903, when the portable apparatus 311 is not connected to the recording apparatus 101.

A "favorites folder" icon 903d is an icon that indicates a place where the AVC video files belonging to the "program" icon 903b or the QVGA video files belonging to the "going-out program" icon 903a are stored according to the preference of a user. When this icon is clicked, a list of the corresponding video files is displayed in the file list region 904.

When the user clicks the icon of the medium list region 903 on the video list screen 901 displayed by the GUI generation unit 303, the control unit 304 determines the kind of video file associated with this icon and retrieves the content table 308.

When the user clicks the "program" icon 903b, the control unit 304 narrows down and retrieves a recording in which the value of the "movable flag" field of the content table 308 is a logic "false" and guides information displayed in the file list region 904 to the GUI generation unit 303 according to the details of the obtained record.

When the user clicks the "going-out program" icon 903a, the control unit 304 narrows down and retrieves a recording in which the value of the "movable flag" field of the content table 308 is a logic "true" and guides information displayed in the file list region 904 to the GUI generation unit 303 according to the details of the obtained record.

A status display region 905 is displayed below the file list region 904. In the status display region 905, there are displayed a "writing destination" pull-down menu 905a and a "transmission start" button 905b displayed only when the "going-out program" icon 903a is highlighted and displayed in the medium list region 903 by clicking and selecting the "going-out program" icon 903a; and a capacity indication bar 905c typically displayed irrespective of the selection status of the medium list region 903.

As described above, FIG. 9 shows the video list screen 901 in which the "going-out program" icon 903a is highlighted and displayed. In this state, when one or the plurality of QVGA video files displayed in the file list region 904 is clicked and selected, the icon of the selected QVGA video file is highlighted and displayed.

When the portable apparatus 311 now displayed in the "writing destination" pull-down menu 905a of the status display region 905 and currently connected to the recording apparatus 101 is selected and the "transmission start" button 905b is pressed down in the state where the icon of the QVGA video file is highlighted and displayed, the control unit 304 reads the selected QVGA video file from the content table 308, confirms the recording in which the value of the "movable flag" field is "true", and then moves the selected QVGA video file to the storage 205 (not shown) of the designated portable apparatus 311. At this time, the control unit 304 also moves the recording corresponding to the QVGA video file of the content table 308 to a portable content table (not shown) formed in the storage 205 (not shown) provided within the portable apparatus 311.

When the "going-out program" icon 903a shown in FIG. 9 is highlighted and displayed, the selected QVGA video file may be moved to the portable apparatus 311 by directly dragging and dropping the icon of the QVGA video file displayed in the file list region 904 to the "portable apparatus" icon 903c.

FIG. 10 is a schematic diagram illustrating a video list screen 901 displayed on the display unit 209. FIG. 10 shows the "program" icon 903b of the medium list region 903 which is clicked so as to be highlighted and displayed in the video list screen 901 shown in FIG. 9.

This video list screen is similar to the video list screen shown in FIG. 9. However, the control unit 304 controls the GUI generation unit 303 so that the "writing destination" pull-down menu 905a and the "transmission start" button 905b are not displayed in the status display region 905 when the "program" icon 903b is clicked. Therefore, the icon displayed in the file list region 904 is an icon that indicates the AVC video file and this AVC video file is unmovable to the portable apparatus 311. In order to indicate that the AVC video file is unmovable to the portable apparatus 311, in the status display region 905, the "writing destination" pull-down menu 905a and the "transmission start" button 905b are not displayed and the "portable apparatus" icon 903c is faintly displayed in the medium list region 903.

Accordingly, even when the icon of the AVC video file displayed in the file list region 904 is clicked, the AVC video file is unmovable to the portable apparatus 311 due to the fact that the "transmission start" button 905b is not displayed. Moreover, even when the icon of the AVC video file is dragged and dropped to the "portable apparatus" icon 903c, the control unit 304 confirms that the value of the "movable flag" field of the AVC video file associated with the icon is "false" and thus performs an animation display indicating that the AVC video file is unmovable and showing that the icon is returned to the original position.

This embodiment may be modified as follows.

(1) The reduced video data file is not limited to the QVGA video file. Similarly, the standard video data file is not limited to the AVC video file. A general H.264 is used in a codec of these video files, but various codecs such as WMV, VP6, and Theora may be used. Likewise, the container is not limited to the MP4 container, but various video container formats such as AVI, Ogg, Matroska, 3 GPP, and 3GPP2 may be used.

(2) In the recording apparatus according to this embodiment, the transcoder 213 is a hardware unit that performs video transcoding of a specific format. The plurality of codecs or containers described above may be selected by using FPGA in the transcoder 213 so as to be programmable.

In this embodiment, the recording apparatus has been disclosed.

Tracking reproduction may be realized by using a hardware transcoder capable of performing a transcoding process on the AVC video file and the QVGA video file, in which the still images are buried, in real time from the digital video stream data received through digital TV broadcast waves and subjected to decoding and by updating the display of the film roll region 703 in real time during the recording monitoring. Therefore, convenience of television recoding is considerably improved in the recording apparatus according to this embodiment. Moreover, since the state of the recording progress is visually displayed for a user by updating the display of the film roll region 703 in real time during the recording monitoring, visual enjoyment can be provided.

By performing the recording just once, the recording apparatus according to this embodiment can simultaneously generate the AVC video file unmovable to a portable apparatus and the QVGA video file movable to a portable apparatus. That is, two kinds of video files with completely the same program name can be generated by performing the recording once. Therefore, it is necessary to provide a user interface so that a user does not erroneously select the video file when the user moves the video file to a portable apparatus. Accordingly, in the recording apparatus according to this embodiment, the content table is provided with a flag field indicating whether the video file is movable to the portable apparatus and a video file selection screen is distinguished based on the flag field. In the recording apparatus according to this embodiment, since a user enjoying video play with a portable apparatus can simply move the video file without erroneous selection of the video file, better convenience can be provided for the user.

The present application contains subject matter related to that disclosed in Japanese Priority Patent Application JP 2010-098823 filed in the Japan Patent Office on Apr. 22, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A file management apparatus comprising:
a display;
an operation device;
a storage which stores both reduced video data files and standard video data files with a screen size larger than that of the reduced video data files, the storage storing the reduced video data files in association with a movable flag field indicating that a plurality of the reduced video data files are movable to a portable apparatus and the storage storing the standard video data files with the screen size larger than that of the reduced video data files, the standard video data files being stored in association with the movable flag field indicating that a plurality of the standard video data files are unmovable to the portable apparatus;
an interface to which the portable apparatus is connected and through which the reduced video data files are moved between the storage and the portable apparatus; and
a controller which displays a list of the reduced video data files on the display when the operation device operates a first operation and displays a list of the standard video data files on the display when the operation device operates a second operation and which generates a graphical user interface to display an operation button, which is used to move the reduced video data files to the portable apparatus, on the display, when the portable apparatus is connected to the interface.

2. The file management apparatus according to claim 1, further comprising:
a tuner which receives a television broadcast and outputs a reception video data stream;
a reduction transcoder which outputs a reduced video data stream with an image size reduced from an image size of the reception video data stream; and
a standard transcoder which outputs a recording video data stream with a screen size larger than that of the reduced video data stream from the reception video data stream,
wherein the storage stores the reduced video data stream as a reduced video data file movable to the portable apparatus and stores the recording video data stream as a standard video data file unmovable to the portable apparatus.

3. The file management apparatus according to claim 2, further comprising:
a content table which is formed in the storage and which includes a program name field storing a program name of the television broadcast, a recording time field storing a recording time at which the television broadcast is recorded in the storage using the reduced transcoder and/or the standard transcoder, a file name field storing a file name of the reduced video data file or the standard video data file, and the movable flag field storing information indicating that the reduced video data file is movable to the portable apparatus and the standard video data file is unmovable to the portable apparatus, wherein the controller displays a list of the standard video data files on the display based on a recording obtained by narrowing down and retrieving the content table in the movable flag field when the operation device operates the first operation, whereas the controller displays a list of the reduced video data files on the display based on the recording obtained by narrowing down and retrieving the content table in the movable flag field when the operation device operates the second operation.

4. The file management apparatus according to claim 3, wherein when the operation device operates a third operation of dragging and dropping an icon of the standard video data file to an icon of the portable apparatus displayed on the display from the list of the standard video data files displayed on the display, the controller confirms that a value of the movable flag field of the recording of the content table associated with the icon of the standard video data file is a logic false and displays a ban on movement of the standard video data file associated with the icon of the standard video data file on the display.

5. A recording apparatus comprising:
a tuner which receives a television broadcast and outputs a reception video data stream;
a reduction transcoder which outputs a reduced video data stream with an image size reduced from an image size of the reception video data stream;
a standard transcoder which outputs a recording video data stream with a screen size larger than that of the reduced video data stream from the reception video data stream;
a storage which stores both the reduced video data stream as a reduced video data file and the recording video data stream as a standard video data file with a screen size larger than that of the reduced video data file, the storage storing the reduced video data file in association with a movable flag field indicating the reduced video data file as movable to a portable apparatus and the storage storing the standard video data file with the screen size larger than that of the reduced video data file, the standard video data file being stored in association with the movable flag field indicating the standard video data file as unmovable to the portable apparatus;
an interface to which the portable apparatus is connected and through which the reduced video data file is moved between the storage and the portable apparatus;
a display;
an operation device; and
a controller which displays a list of standard video data files on the display when the operation device operates a first operation and displays a list of reduced video data files on the display when the operation unit operates a second operation and which generates a graphical user interface to display an operation button, which is used to move the reduced video data files to the portable apparatus, on the display, when the portable apparatus is connected to the interface.

6. The recording apparatus according to claim 5, further comprising:
a content table which is formed in the storage and which includes a program name field storing a program name of the television broadcast, a recording time field storing a recording time at which the television broadcast is recorded in the storage using the reduced transcoder and/or the standard transcoder, a file name field storing a file name of the reduced video data file or the standard video data file, and the movable flag field storing information indicating that the reduced video data file is movable to the portable apparatus and the standard video data file is unmovable to the portable apparatus, wherein the controller displays a list of the standard video data files on the display based on a recording obtained by narrowing down and retrieving the content table in the movable flag field when the operation device operates the first operation, whereas the controller displays a list of the reduced video data files on the display based on the recording obtained by narrowing down and retrieving the content table in the movable flag field when the operation device operates the second operation.

7. The recording apparatus according to claim 6, wherein when the operation device operates a third operation of dragging and dropping an icon of the standard video data file to an icon of the portable apparatus displayed on the display from the list of the standard video data files displayed on the display, the controller confirms that a value of the movable flag field of the recording of the content table associated with the icon of the standard video data file is a logic false and displays a ban on movement of the standard video data file associated with the icon of the standard video data file on the display.

8. A non-transitory computer-readable storage medium storing computer-readable instructions thereon, which, when executed by a computer including a display, an operation device, and a controller, cause the computer to perform a recording method comprising:
receiving a television broadcast and outputting a reception video data stream,
reduction transcoding the reception video data stream and outputting a reduced video data stream with an image size reduced from an image size of the reception video data stream,
standard transcoding the reception video data stream and outputting a recording video data stream with a screen size larger than that of the reduced video data stream from the reception video data stream,
storing in a storage both the reduced video data stream as a reduced video data file and the recording video data stream as a standard video data file with a screen size larger than that of the reduced video data file, the storing includes storing the reduced video data file in association with a movable flag field indicating the reduced video data file as movable to a portable apparatus and the storing includes storing the standard video data file with the screen size larger than that of the reduced video data file, the standard video data file being stored in association with the movable flag field indicating the standard video data file as unmovable to the portable apparatus,
moving the reduced video data file between the storage and the portable apparatus through an interface to which the portable apparatus is connected, and
operating the controller which displays a list of standard video data files on the display when the operation device operates a first operation and displays a list of reduced video data files on the display when the operation device operates a second operation and which generates a graphical user interface to display an operation button, which is used to move the reduced video data files to the portable apparatus, on the display, when the portable apparatus is connected to the interface.

9. The non-transitory computer-readable storage medium according to claim 8, further causing the computer to operate a content table which is formed in the storage and which includes a program name field storing a program name of the television broadcast, a recording time field storing a recording time at which the television broadcast is recorded in the storage using the reduction transcoding and/or the standard transcoding, a file name field storing a file name of the reduced video data file or the standard video data file, and the movable flag field storing information indicating that the reduced video data file is movable to the portable apparatus and the standard video data file is unmovable to the portable apparatus, wherein the controller displays a list of the standard video data files on the display based on a recording obtained by narrowing down and retrieving the content table in the movable flag field when the operation device operates the first operation, whereas the controller displays a list of the reduced video data files on the display based on the recording obtained by narrowing down and retrieving the content table in the movable flag field when the operation device operates the second operation.

10. The non-transitory computer-readable storage medium according to claim 9, wherein when the operation device operates a third operation of dragging and dropping an icon of the standard video data file to an icon of the portable apparatus displayed on the display from the list of the standard video data files displayed on the display, the controller confirms that a value of the movable flag field of the recording of the content table associated with the icon of the standard video data file is a logic false and displays a ban on movement of the standard video data file associated with the icon of the standard video data file on the display.

11. A non-transitory computer-readable storage medium storing computer-readable instructions thereon, which, when executed by a computer including a display, an operation device, and a controller, cause the computer to perform a file management method comprising:

storing in a storage both reduced video data files and standard video data files with a screen size larger than that of the reduced video data files, the storing includes storing the reduced video data files in association with a movable flag field indicating that all of the reduced video data files are movable to a portable apparatus and the storing includes storing the standard video data files with the screen size larger than that of the reduced video data files, the standard video data files being stored in association with the movable flag field indicating that all of the standard video data files are unmovable to the portable apparatus, and moving the reduced video data files between the storage and the portable apparatus through an interface to which the portable apparatus is connected, and operating the controller which displays a list of the reduced video data files on the display when the operation device operates a first operation and displays a list of the standard video data files on the display when the operation device operates a second operation and which generates a graphical user interface to display an operation button, which is used to move the reduced video data files to the portable apparatus, on the display, when the portable apparatus is connected to the interface.

12. The non-transitory computer-readable storage medium according to claim 11, further including receiving a television broadcast and outputting a reception video data stream, reduction transcoding the reception video data stream and outputting a reduced video data stream with an image size reduced from an image size of the reception video data stream, and standard transcoding the reception video data stream and outputting a recording video data stream with a screen size larger than that of the reduced video data stream from the reception video data stream, wherein the storage stores the reduced video data stream as a reduced video data file movable to the portable apparatus and stores the recording video data stream as a standard video data file unmovable to the portable apparatus.

13. The non-transitory computer-readable storage medium according to claim 12, further causing the computer to operate a content table which is formed in the storage and which includes a program name field storing a program name of the television broadcast, a recording time field storing a recording time at which the television broadcast is recorded in the storage using the reduction transcoding and/or the standard transcoding, a file name field storing a file name of the reduced video data file or the standard video data file, and the movable flag field storing information indicating that the reduced video data file is movable to the portable apparatus and the standard video data file is unmovable to the portable apparatus, wherein the controller displays a list of the standard video data files on the display based on a recording obtained by narrowing down and retrieving the content table in the movable flag field when the operation device operates the first operation, whereas the controller displays a list of the reduced video data files on the display based on the recording obtained by narrowing down and retrieving the content table in the movable flag field when the operation device operates the second operation.

14. The non-transitory computer-readable storage medium according to claim 13, wherein when the operation device operates a third operation of dragging and dropping an icon of the standard video data file to an icon of the portable apparatus displayed on the display from the list of the standard video data files displayed on the display, the controller confirms that a value of the movable flag field of the recording of the content table associated with the icon of the standard video data file is a logic false and displays a ban on movement of the standard video data file associated with the icon of the standard video data file on the display.

15. The file management apparatus according to claim 2, wherein the reduced video data files and the standard video data files are stored in the storage and displayed on the display in association with a corresponding program name of the television broadcast, and a user-selected one of a reduced video data file and a standard video data file corresponding to a program name of the television broadcast is reproduced when the operation device operates a fourth operation.

16. The recording apparatus according to claim 5, wherein the reduced video data files and the standard video data files are stored in the storage and displayed on the display in association with a corresponding program name of the television broadcast, and a user-selected one of a reduced video data file and a standard video data file corresponding to a program name of the television broadcast is reproduced when the operation device operates a fourth operation.

17. The non-transitory computer-readable storage medium according to claim 8, wherein the reduced video data files and the standard video data files are stored in the storage and displayed on the display in association with a corresponding program name of the television broadcast, and a user-selected one of a reduced video data file and a standard video data file corresponding to a program name of the television broadcast is reproduced when the operation device operates a fourth operation.

18. The non-transitory computer-readable storage medium according to claim 12, wherein the reduced video data files and the standard video data files are stored in the storage and displayed on the display in association with a corresponding program name of the television broadcast, and
    a user-selected one of a reduced video data file and a standard video data file corresponding to a program name of the television broadcast is reproduced when the operation device operates a fourth operation.

19. The recording apparatus according to claim 5, wherein the reduction transcoder and the standard transcoder respectively output the reduced video data stream and the recording video data stream simultaneously.

20. The non-transitory computer-readable storage medium according to claim 8, wherein the reduction transcoding and the standard transcoding are performed simultaneously.

* * * * *